United States Patent

Garnett et al.

[11] Patent Number: 5,509,100
[45] Date of Patent: Apr. 16, 1996

[54] CABLE GUIDE INCLUDING STACKED QUADRANTS FOR STRESS RELIEF

[75] Inventors: John G. Garnett, Congleton; Trevor J. Jones, Leigh; Roy Moon, Eastleigh, all of Great Britain

[73] Assignee: International Computers Limited, Putney, England

[21] Appl. No.: 375,852

[22] Filed: Jan. 20, 1995

[30] Foreign Application Priority Data

Mar. 4, 1994 [GB] United Kingdom .................... 9404154

[51] Int. Cl.⁶ ..................................... G02B 6/00
[52] U.S. Cl. ............................ 385/136; 385/86; 385/87; 385/100; 385/134; 385/137
[58] Field of Search ............................ 385/86, 87, 100, 385/106, 112, 134, 135, 136, 137

[56] References Cited

U.S. PATENT DOCUMENTS 5,115,260  5/1992  Hayward et al. ....................... 385/100
5,237,640  8/1993  Pedraza et al. ......................... 385/136
5,241,617  8/1993  Peacock et al. ......................... 385/135
5,268,986  12/1993  Kakii et al. .............................. 385/135

FOREIGN PATENT DOCUMENTS

WO86/01349  2/1986  European Pat. Off. ........... 385/100 X
0474609  3/1992  European Pat. Off. ........... 385/136 X
2206455  1/1989  United Kingdom ............... 385/136 X

*Primary Examiner*—Brian Healy
*Attorney, Agent, or Firm*—Lee, Mann, Smith, McWilliams, Sweeney & Ohlson

[57] ABSTRACT

A cable guide for a bundle of optic fibre cables, consists of a number of stackable plastic quadrants, clamped together to form a number of channels. The quadrants have radial ribs to grip the cables and to provide stress relief. The cables are held in the channels by a restraint.

9 Claims, 2 Drawing Sheets

CABLE GUIDE INCLUDING STACKED QUADRANTS FOR STRESS RELIEF

BACKGROUND OF THE INVENTION

This invention relates to a guide for cables and is particularly, although not exclusively, concerned with a guide for positioning and providing direction control for a bundle of fibre optic cables.

It is known, for example in communications or computer equipment, to interconnect units by means of a bundle of cables, such as fibre optic cables. These cables may become tangled and may therefore require untangling before a fault in the cable can be identified and repaired.

The object of this invention is to provide an inexpensive and effective means for positioning a bundle of cables in a way which overcomes the problems described above.

SUMMARY OF THE INVENTION

According to the invention, there is provided a cable guide comprising means for defining a plurality of channels, each channel being adapted to hold a plurality of cables and each of said channels having means for defining a minimum radius for the cables in that channel.

DESCRIPTION OF AN EMBODIMENT OF THE INVENTION

A fibre optic guide in accordance with the invention will now be described by way of example with reference to the accompanying drawings.

Figure 1:
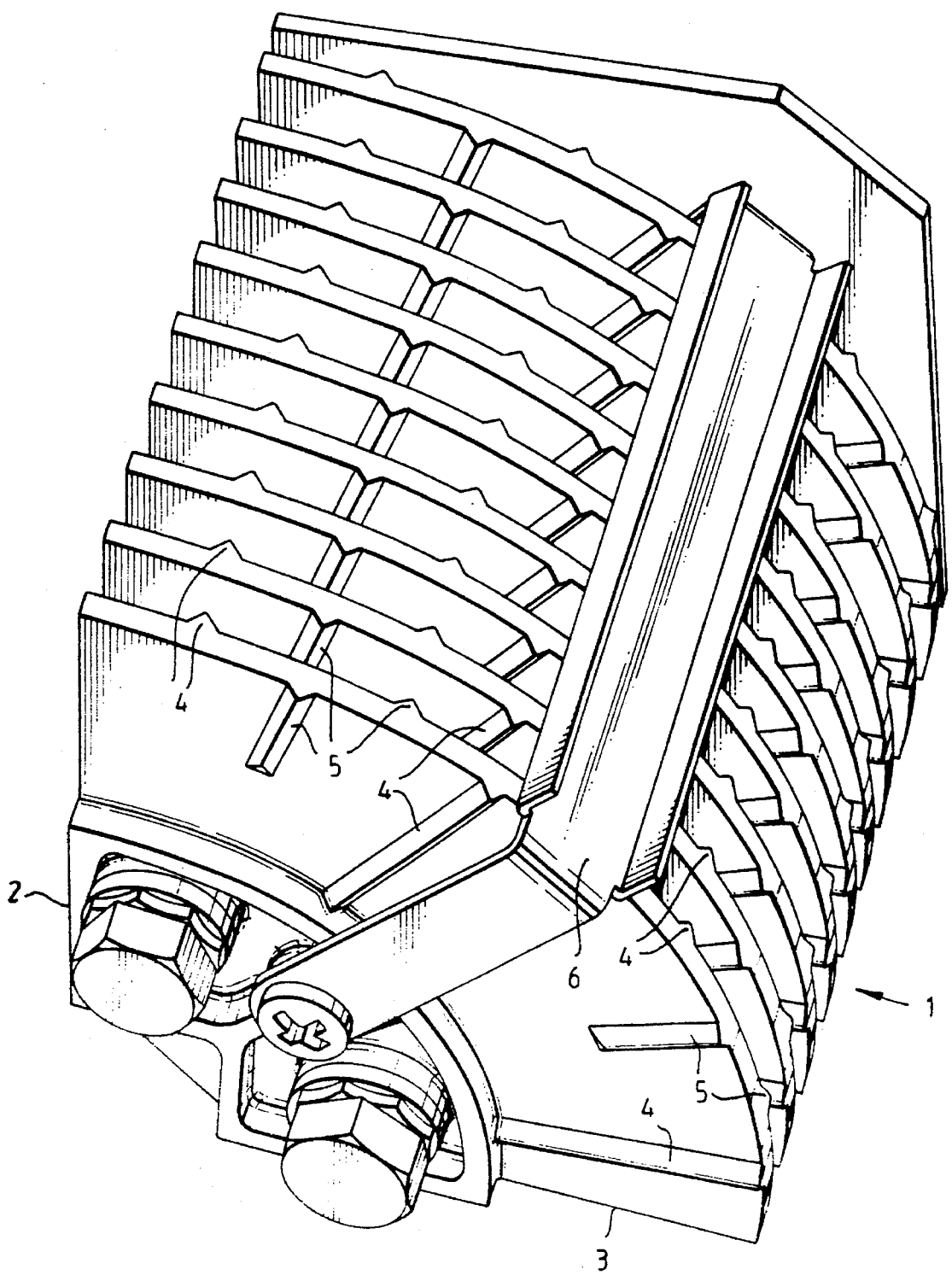
FIG. 1 is a view of an assembled guide embodying the invention.
Figure 2:
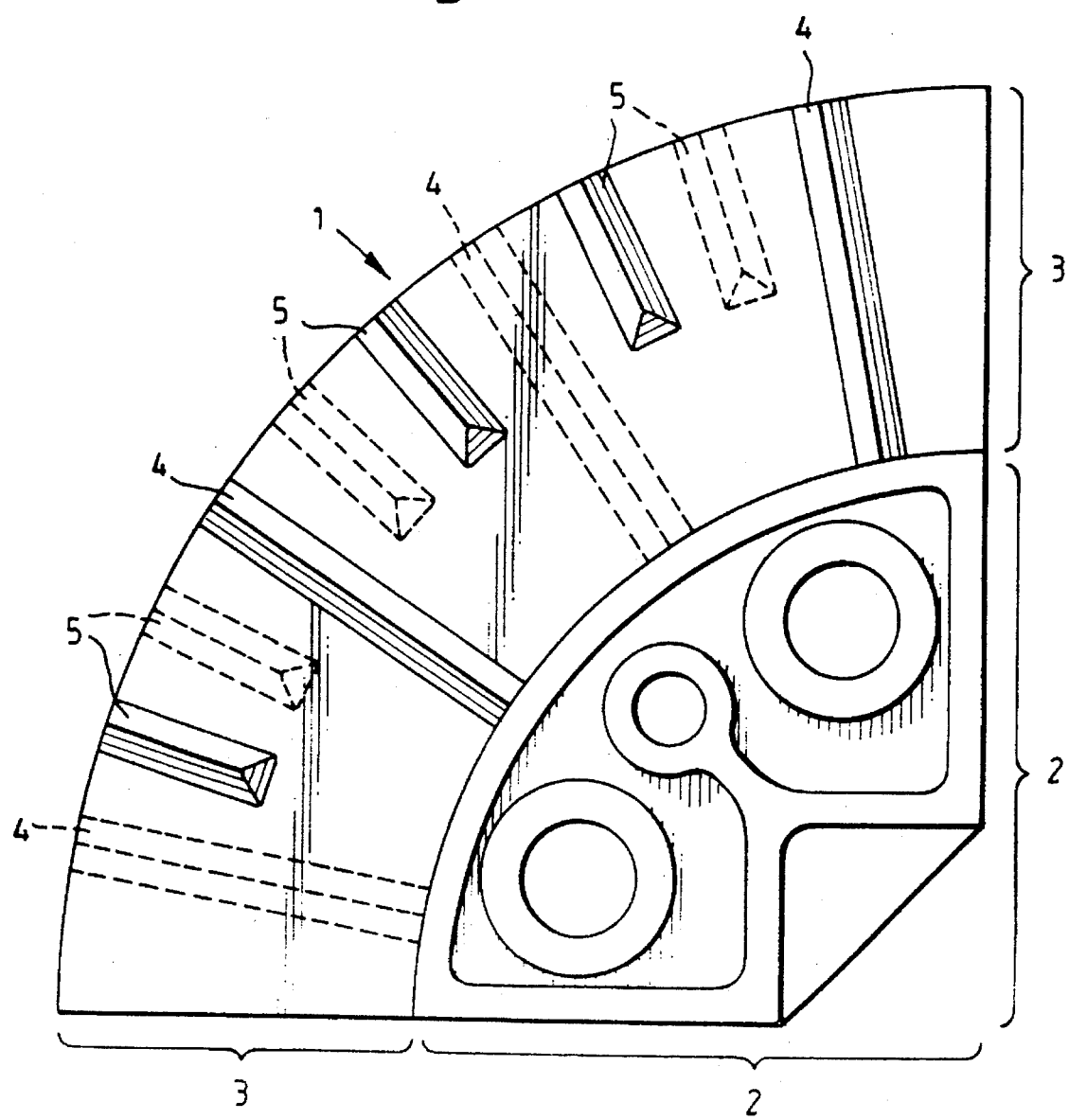
FIG. 2 shows a unit used to form the assembled guide.

Referring to FIGS. 1 and 2 the guide consists of a plurality of plastic units 1 each of which is shaped as a quadrant of a circle, and which can be stacked together to form a required number of guide channels. Each unit consists of a centre portion 2, and a flange portion 3 which provides a wall of sufficient height to support the required number of fibre optic cables stacked one on top of the other. The guide channels should not be too deep because increased depth causes weakness and requires thicker walls. The units are bolted together by means of bolts passing through holes in each unit.

The outside radius of the centre portion 2 defines the minimum radius of curvature for cables in each of the guide channels, and is chosen to be equal to or greater than the minimum permitted bend radius of the cables.

The flange portion 3 has a plurality of radial ribs 4 which distort the soft outer sheath of the fibre optic cable and which also force the stacked cables against alternate sides of the walls of the flange causing them to snake. This ensures that the cables are gripped tightly in the guide channels and thereby provides longitudinal stress relief.

The longitudinal stress relief is a function of the bend radius of the cables. The outer cables are not gripped as well as the inner cables. For this reason extra radial ribs 5 are provided at radially outward positions to grip the outer cables in each channel. The outer cables may still over time ease out of the guide channels and therefore a restraint 6 is provided at the open ends of the slots to keep the cables in place.

In a modification, the restraint 6 may be extended so that it covers the channels over the whole circumference of the quadrant, and may be adapted so that it is attached at one end only.

In another form of the invention, the cable guide may consist of a series of concentric arc shaped walls attached to a base plate to produce a series of guide channels each of which is capable of holding a plurality of cables. In this implementation the degree of curvature defined by the centre provides sufficient resistance to longitudinal stress, as long as the guide channel width ensures the fibre optic cables fit tightly within the guide channels.

We claim:

1. A cable guide comprising a plurality of similar units, each of said units comprising a center portion and a flange portion, said units being stacked together to define a plurality of channels, each channel being defined by the respective flange portions of an adjacent pair of said units and by the center portion of one of said adjacent pair of said units, and each channel being adapted to hold a plurality of cables, and each said center portion defining a minimum radius of curvature for the cables in a respective one of said channels.

2. A cable guide according to claim 1 wherein each of said units is generally shaped in the form of a quadrant of a circle.

3. A cable guide according to claim 1 wherein each channel has means for gripping a cable along a portion of the length of said cable, thereby providing longitudinal stress relief.

4. A cable guide comprising a plurality of similar units stacked together to define a plurality of channels, each of said units being generally shaped in the form of a quadrant of a circle, each channel being defined by an adjacent pair of said units, each channel being adapted to hold a plurality of cables, and each of said units having means for defining a minimum radius of curvature for the cables in a respective one of said channels.

5. A cable guide according to claim 4 wherein each channel includes means for gripping a cable along a portion of the length of said cable, thereby providing longitudinal stress relief.

6. A cable guide according to claim 5 wherein said means for gripping a cable consists of a plurality of radially extending ribs within each said channel.

7. A cable guide according to claim 6 further including additional ribs at radially outward positions within each said channel.

8. A cable guide comprising a plurality of similar units stacked together to define a plurality of channels, each channel being defined by an adjacent pair of said units, each channel being adapted to hold a plurality of cables, each of said units having means for defining a minimum radius of curvature for the cables in a respective one of said channels, and each of said channels having means for gripping said cables along a portion of the length of said cables, thereby providing longitudinal stress relief.

9. A cable guide according to claim 8 wherein said means for gripping said cables comprises a plurality of ribs within each channel.

* * * * *